United States Patent [19]

Shultz

[11] 4,339,865

[45] Jul. 20, 1982

[54] APPARATUS AND METHOD FOR INSERTING AND REMOVING BUSHINGS AND BEARINGS

[76] Inventor: William E. Shultz, 239 N. Main St., Lombard, Ill. 60148

[21] Appl. No.: 127,939

[22] Filed: Mar. 7, 1980

[51] Int. Cl.[3] ........................ B23P 19/04; B25B 27/02

[52] U.S. Cl. ........................................ 29/525; 29/255; 29/275

[58] Field of Search ...................... 29/426.5, 525, 254, 29/255, 275, 280, 263, 251, 450

[56] References Cited

U.S. PATENT DOCUMENTS

| | | | |
|---|---|---|---|
| 1,364,489 | 1/1921 | Edelblut | 29/275 |
| 1,510,866 | 10/1924 | Seppmann | 29/275 |
| 1,958,330 | 5/1934 | Beard | 29/255 |
| 2,428,179 | 9/1947 | Robinson | 29/275 |
| 2,646,619 | 7/1953 | McCord | 29/263 |
| 2,775,025 | 12/1956 | Williams | 29/275 |
| 4,050,136 | 9/1977 | Shultz | 29/263 |

*Primary Examiner*—Gene Crosby
*Attorney, Agent, or Firm*—Mason, Kolehmainen, Rathburn & Wyss

[57] ABSTRACT

Apparatus and method are disclosed for removing or inserting a bushing or bearing. The apparatus of the present invention includes an elongated bushing or bearing drive shaft; an adjustable sized mandrel which includes a plurality of bushing or bearing drive shoulders; a mandrel spreader for adjusting the mandrel drive shoulders to a predetermined dimension; and a depth stop sleeve adjustably mounted on the elongated drive shaft for determining the depth to which the bushing or bearing can be inserted in any given device. The depth stop sleeve is used only for insertion and not for removal.

18 Claims, 17 Drawing Figures

APPARATUS AND METHOD FOR INSERTING AND REMOVING BUSHINGS AND BEARINGS

FIELD OF THE INVENTION

The present invention relates to a method and apparatus for removing or inserting bushings or bearings. More particularly, the present invention relates to a method and apparatus for inserting or removing bushings or bearings wherein the apparatus is adjustable to accommodate bushings or bearings of any given size for insertion or removal at any given location and particularly within an automobile transmission.

BACKGROUND OF THE INVENTION

When a bushing is initially inserted within an annular aperture such as in the manufacture of a transmission pump, an interior surface of the annular aperture is machined to provide a slot for the bushing with the end of the machined surface forming a shoulder. The formed slot is generally longer than the bushing to be inserted. In the initial assembly line operation, for example in automobile part manufactured, it is not difficult with automated assembling apparatus to accurately place the bushing within the longer slot to the proper depth. In the later process of repair by removing the old bushing and inserting a new bushing, it becomes a very difficult task to insert the new bushing to the proper depth within the elongated slot. Generally, such as in the case of an automobile transmission pump, the bushing should not be driven to the end of the elongated slot against the formed shoulder but is inserted to the proper depth when there is some distance between the bushing end and the formed shoulder defined by the slot. Many times the mechanic will insert the new bushing within the slot by driving the bushing as far as it can go to the slot shoulder, sometimes causing the bushing to "roll" on its edges or compress radially inwardly when the edges contact the slot shoulder so that one of the annular edges of the inserted new bushing protrudes inwardly further than it should, creating very serious problems with whatever part the bushing is designed to circumscribe.

The present invention relates to a method and apparatus designed for bushing and bearing removal and very accurate insertion. The apparatus is adjustable to accommodate bushings or bearings of various predetermined sizes and is designed so that the mechanic easily can determine the location of the bushing or bearing to be removed so that he can provide a drive shoulder thereagainst for removal. The apparatus of the present invention also includes an adjustable depth stop sleeve for bushing or bearing insertion to accurately locate a new part to its proper depth within an elongated slot.

PRIOR ART

A U.S. Pat. No. to McCord 2,646,619 describes a bushing remover tool which includes a plurality of bushing contacting shoulders which are flexibly biased radially so that the shoulders can be initially disposed behind a bushing by compressing the shoulders radially to spread behind the bushing when the tool is inserted to the proper depth. Such a tool is inefficient because, depending upon the size of the bushing, the shoulders which should be flush against an annular bushing surface and aligned to provide a maximum and non-slipping driving force usually are not in full contact with the bushing surface. The driving shoulders of a tool such as that disclosed in the McCord patent have only a single unbiased diameter and therefore are flush against the bushing for removal only when the busing is of the exact some diameter as that of the tool driving shoulders when manufactured. The apparatus of the present invention provides an adjustable bushing or bearing drive shoulder which is maintained in full contact with the bushing or bearing to be removed or inserted to provide maximum driving force without slippage.

SUMMARY OF THE INVENTION

An object of the present invention is to provide a new and improved method and apparatus capable of inserting or removing bushings or bearings of any predetermined size.

Another object of the present invention is to provide a new and improved apparatus including size adjustable bushing or bearing drive shoulders capable of being expanded to any predetermined size while maintaining flush contact against a drive surface of a bushing or bearing.

Another object of the present invention is to provide an apparatus for inserting or removing bushings or bearings including an adjustable depth step sleeve so that when a bushing or bearing is inserted, the depth stop sleeve will accurately position a new bushing or bearing in its proper location.

Another object of the present invention is to provide a bushing driving apparatus wherein elastomeric O-rings are included for holding a bushing on the apparatus without slippage while the bushing is inserted into a desired location and driven into position.

In brief, the apparatus of the present invention includes an elongated bushing or bearing drive shaft; an adjustable sized mandrel which includes a plurality of bushing or bearing drive shoulders; a mandrel spreader for adjusting the mandrel drive shoulders to a predetermined dimension; and a depth stop sleeve adjustably mounted on the elongated drive shaft for determining the depth to which the bushing or bearing can be inserted in any given device. The depth stop sleeve is used only for insertion and not for removal.

DETAILED DESCRIPTION OF THE PRESENT INVENTION

Figures 1, 9, 10:
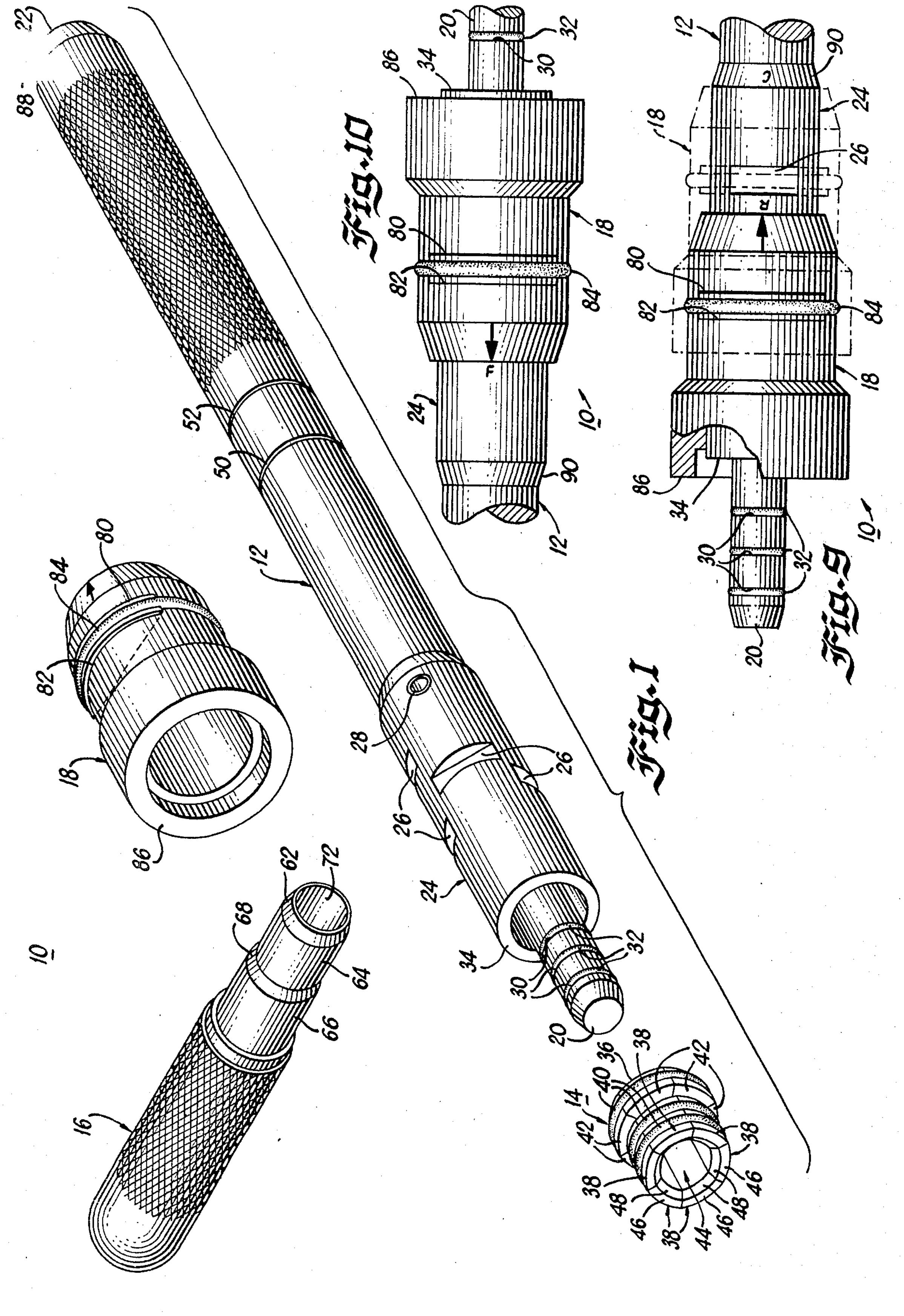
FIG. 1 is a perspective exploded view of the apparatus of the present invention.
FIG. 9 is a partially elevational, partially broken-away view of a portion of the apparatus of the present invention showing a depth stop sleeve being in one position and in a position in broken lines for bushing or bearing insertion at various depth dimensions.
FIG. 10 is an elevational view showing the depth stop sleeve in position on the apparatus of the present invention.

Turning now to FIG. 1, the apparatus of the present invention is generally designated by reference numeral 10. The apparatus includes an elongated driving shaft, generally designated by reference numeral 12; a bushing or bearing driving mandrel, generally designated by reference numeral 14; a mandrel spreader, generally designated by reference numeral 16; and a depth stop sleeve, used only for insertion, generally designated by reference numeral 18. The elongated driving shaft 12 includes a bushing or bearing surface contacting end 20 and a driving end 22. FIG. 1 shows a separate driving shaft portion 24 attached to the driving shaft 12. The driving shaft portion 24 includes a plurality of depth stop sleeve alignment slots 26. The separate driving shaft portion 24 can be formed as an integral part of the elongated driving shaft 12, but in this particular embodiment driving shaft portion 24 is secured to the remainder of the driving shaft 12 by a roll pin 28 which is secured into the driving shaft and extends completely through the driving shaft 12 to secure driving shaft portion 24 thereto. The bushing or bearing surface contacting end 20 of driving shaft 12 is of smaller dimension than the driving end 22 of driving shaft 12 to accommodate the mandrel 14 thereover. The annular bushing or bearing contacting end 20 of driving shaft 12 can be an integral part of the drive shaft 12 or may be formed from a separate smaller piece which is secured to the driving shaft 12 by the roll pin 28. The end 20 of driving shaft 12 includes a plurality of slots 30 containing elastomeric O-rings 32 for frictional engagement of an inner surface of the mandrel 14 to secure the mandrel 14 in position circumscribing the annular smaller end 20 of drive shaft 12. In accordance with an important feature of the present invention, the elastomeric O-rings 32 extend radially outwardly from the slots 30 so that the O-rings 32 compress slightly radially inwardly when the mandrel 14 is placed over O-rings 32 to hold the mandrel 14 in non-slip engagement over the smaller end 20 of drive shaft 12. The driving shaft portion 24 of driving shaft 12 includes a flat shoulder 34 for positioning the mandrel 14 thereagainst. The mandrel 14 includes a flat rear shoulder 36 for contact against shoulder 34 of driving shaft portion 24 so that force transmitted through driving shaft shoulder 34 will be transmitted to the rear shoulder 36 of mandrel 14 for driving a bushing or bearing into or out of position.

Figure 4:
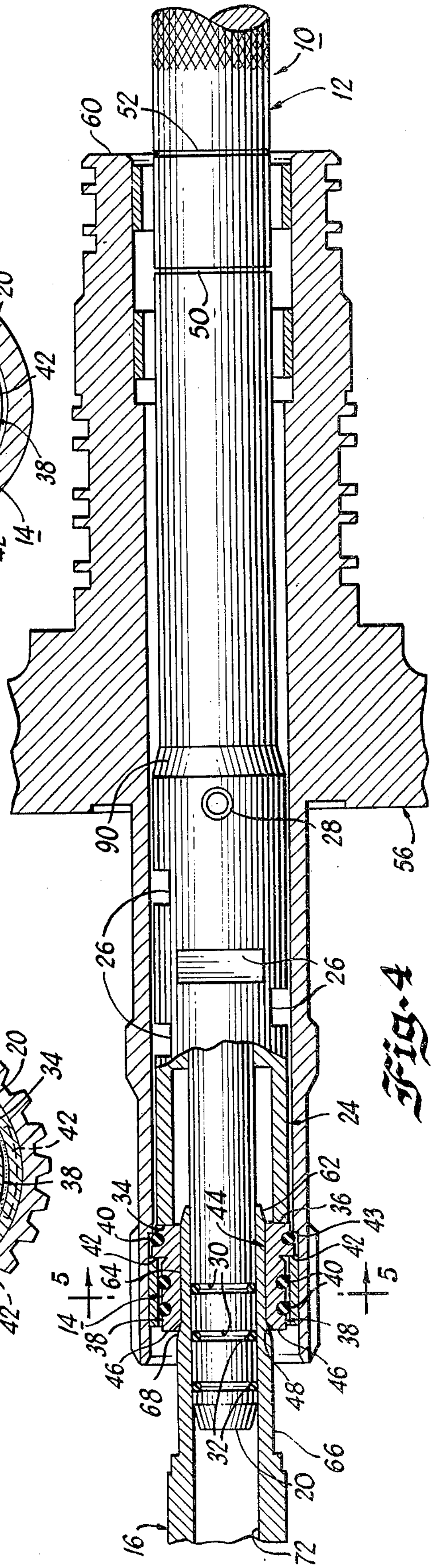
FIG. 4 is a partially elevational, partially broken-away view of the apparatus of the present invention shown as aligned for initial driving for removal of the bushing.

The mandrel 14 is formed from a plurality of annular segments 38 expandably held together as shown in FIG. 1 with a plurality of elastomeric O-rings 40. The mandrel 14 also includes a bushing or bearing contacting shoulder 42 on each expandable segment for contact against a bushing or bearing to transmit force from the driving shaft through driving shaft shoulder 34, through mandrel rear shoulder 36 and through the bushing or bearing drive shoulders 42 for insertion or removal of a busining or bearing. In accordance with an important feature of the present invention, rear shoulder 36 of mandrel 14 has a smaller outer diameter than the outer diameter of drive surfaces 42 to permit the drive surfaces 42 of segments 38 to be positioned properly behind the bushing to be removed, as shown in FIG. 4. If rear shoulder 36 of mandrel 14 were of an outer diameter equal to the outer diameter of surfaces 42, the mandrel drive surfaces 42 in many cases, could not be positioned properly behind the annular bushing surface for removal because the mandrel rear shoulder 36 would be in contact with the bushing slot shoulder 43 (FIG. 4). The necessity of providing a rear shoulder 36 with a smaller outer diameter than the outer diameter of drive shoulders 42 depends upon the distance between the annular bushing end surface and the bushing slot shoulder 43 (whether the rear shoulder 36 will fall in front of slot shoulder 43) but generally the bushing slot is not sufficiently elongated to permit the rear shoulder to lie in front of slot shoulder 43, as shown in FIG. 4. In accordance with a preferred embodiment of the present invention, mandrel rear shoulder 36 has an outer diameter 1/32 to 1/16 inch less than the outer diameter of drive shoulders 42.

For bushing insertion, a bushing is placed over the mandrel segments until an annular bushing end is in contact with drive shoulders 42. The segments 38 of mandrel 14 then are spread radially outwardly with mandrel spreader 16 until the elastomeric O-rings 40 are radially compressed by contact against an inner surface of the bushing. In accordance with an important feature of one embodiment of the present invention, the compressed elastomeric O-rings hold the bushing in place over mandrel 14 in non-slipping engagement so that the bushing will not fall off of the mandrel 14 during bushing insertion. The elastomeric O-rings 40 extend radially outwardly from the mandrel 14 so that the O-rings 40 compress against the interior bushing surface to hold the bushing in position.

The mandrel is slid over the bushing or bearing contacting end 20 of the bushing or bearing driving shaft 12 so that the larger end 36 of mandrel 14 is held against the flat surface 34 of the bushing or bearing driving shaft 12 by frictional engagement of elastomeric O-rings 32 disposed on the bushing or bearing contacting end 20 to frictionally press against an inner surface 44 of the mandrel 14. In accordance with another important feature of the present invention, each segment 38 of mandrel 14 (FIG. 1) includes a flattened smaller end surface 46 and a tapered surface 48 proceeding inwardly from surface 46 and toward a longitudinal central axis of mandrel 14. These tapered surfaces permit insertion of mandrel spreader 16 between the smaller end 20 of driving shaft 12 and the interior surface 44 of mandrel 14 to spread the mandrel 14 to its proper diameter corresponding to the interior diameter of a bushing.

Figure 2:
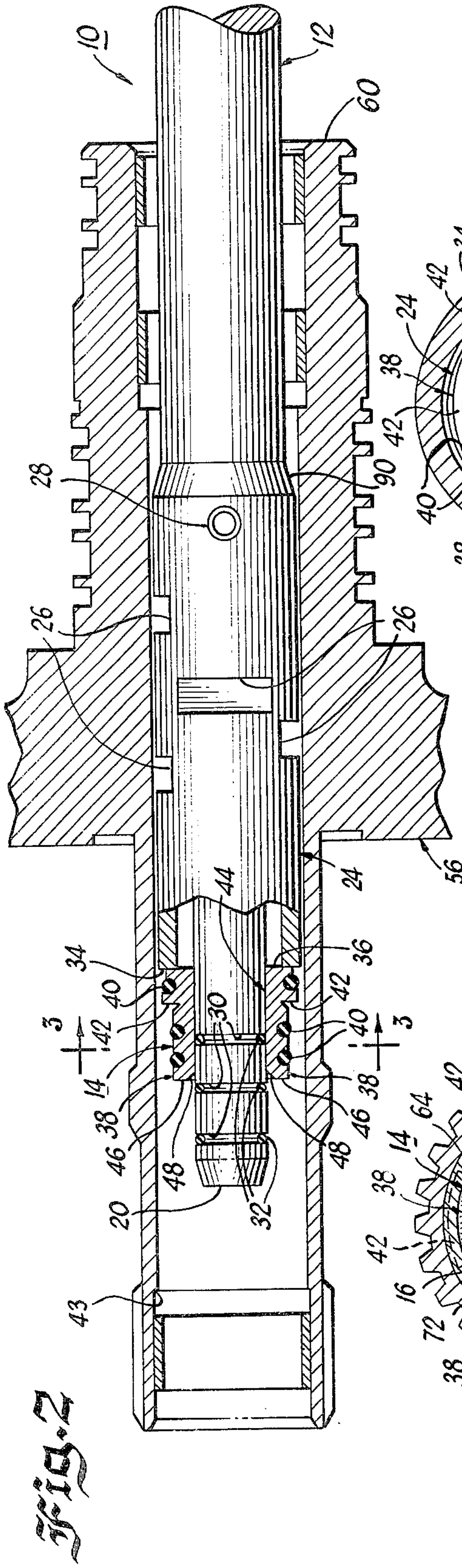
FIG. 2 is a partially elevational, partially broken-away view of the apparatus of the present invention shown initially being aligned for bushing removal.
Figure 3:
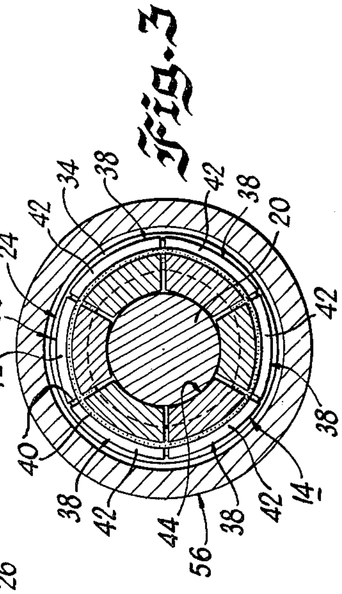
FIG. 3 is a cross-sectional view of the apparatus of the present invention taken along the line 3—3 of FIG. 2.
Figure 5:
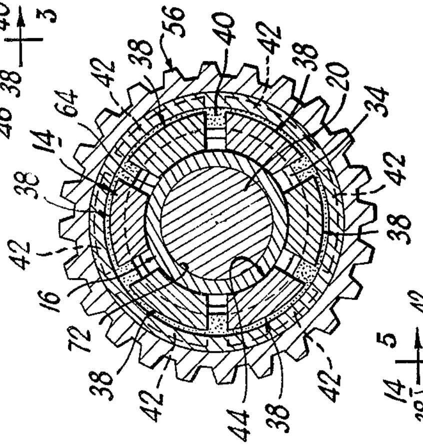
FIG. 5 is a cross-sectional view of the apparatus of the present invention taken along the line 5—5 of FIG. 4.
Figure 6:
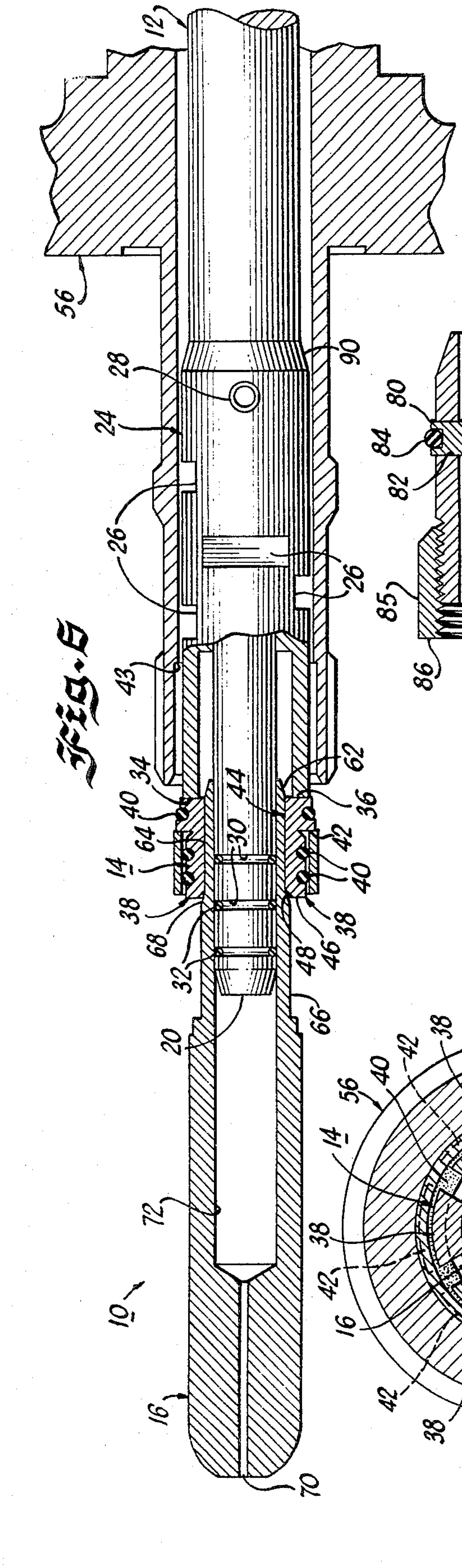
FIG. 6 is a partially elevational, partially broken-away view of the apparatus of the present invention shown during bushing removal.
Figure 8:
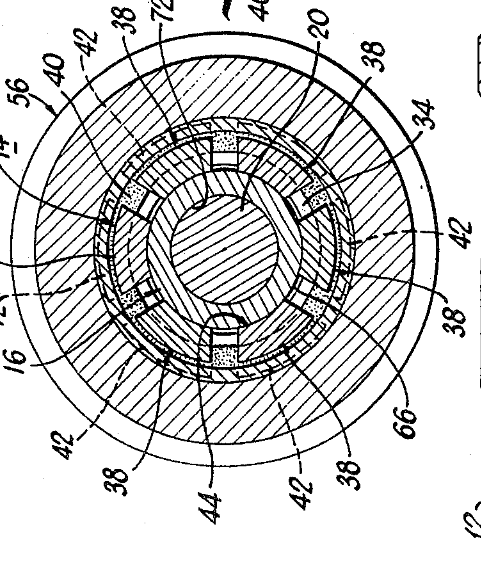
FIG. 8 is a cross-sectional view of the apparatus of the present invention taken along the line 8—8 of FIG. 7.
Figure 7:
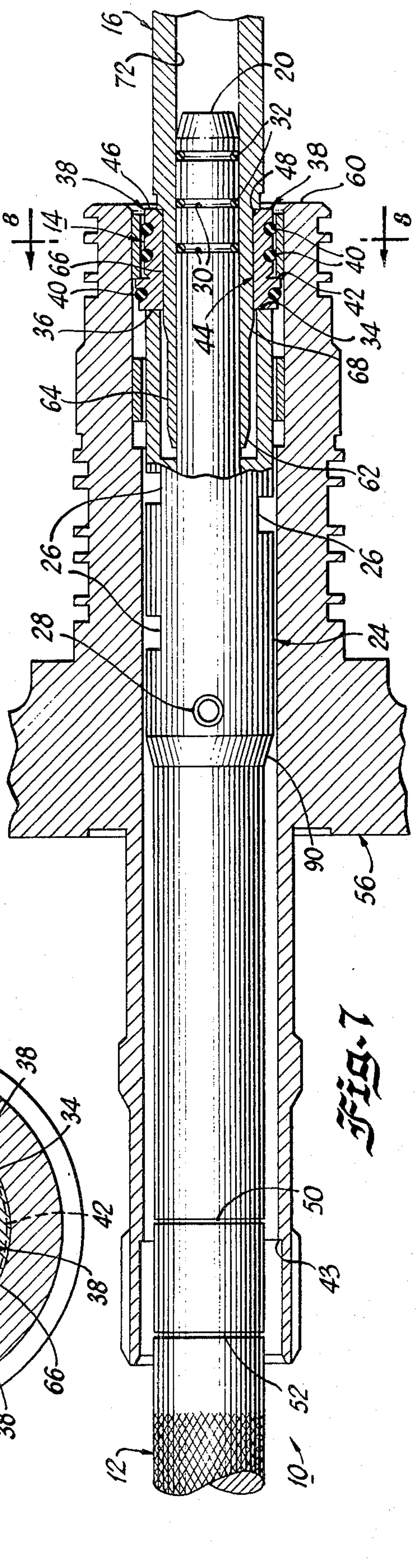
FIG. 7 is a partially elevational partially broken-away view of the apparatus of the present invention shown initially aligned for removal of a bushing in the rear end of an automobile transmission pump.

When a bushing or bearing is being removed, a shown in FIGS. 2 and 4, the mandrel is slid over the smaller end 20 of bushing or bearing driving shaft 12 so that mandrel flat end surface 36 engages the flat end surface 34 of the driving shaft 12. At this point, the driving shaft 12 together with the mandrel 14 in position thereon, are together slid into the transmission pump, as shown in FIG. 2, and the driving shaft proceeds within the transmission pump until the proper locating line 50 or 52 (in the case of FIG. 4 locating line 52) is in alignment with the rear end 60 of transmission pump 56. When the proper locating line (i.e. 52) is in alignment with the end 60 of the transmission pump, as shown in FIG. 4, driving shaft 12 is in a location to properly align the driving shaft 12 with respect to the bearing being removed from the front end of the transmission pump. The driving shaft 12 can include any number of locating lines for different models or makes of transmission pumps or the like to assure that the mandrel 14 is properly positioned with respect to the bearing or bushing being removed so that when the mandrel is spread, the drive surfaces 42 of the mandrel segments 38 will be exactly positioned against an annular end surface of the bushing or bearing, as shown in FIG. 4. Once the proper positioning or locating line 52 is aligned with the rear end 60 of the transmission pump, the mandrel spreader 16 is inserted between the bushing or bearing contacting end 20 of the driving shaft 12 and against interior surface 44 of the mandrel 14 to its proper diameter so that the mandrel drive surfaces 42 will engage a rear annular end surface of the bushing or bearing, as shown in FIG. 4. For this purpose, the mandrel spreader 16 includes a tapered mandrel contacting end surface 62 for engaging cooperatively tapered surfaces 48 of each mandrel segment 38 for initially spreading the mandrel. The mandrel spreader 16 includes a first outer annular surface 64 and a second larger outer annular surface 66 so that the mandrel 14 can be spread to two different diameters. The mandrel spreader 16 includes a tapered surface 68 between the two outer annular surfaces 64 and 66 which is also cooperatively tapered with the mandrel inner tapered surfaces 48 for spreading the mandrel from an inner diameter corresponding to mandrel spreader 64 to an inner diameter corresponding to mandrel spreader surface 66. The mandrel spreader 16 can be provided with any desired number of different diameter annular surfaces such as 64 and 66 with tapered surfaces therebetween to accommodate any number of different diameter bushings or bearings. It is to be understood that a plurality of mandrel spreaders of different outer diameters can be provided instead of providing a single spreader with a plurality of different diameter annular surfaces. FIG. 3 shows the disposition of the mandrel 14 prior to being spread by mandrel spreader 16 while FIG. 5 shows the disposition of the mandrel 14 when spread by the first spreading surface 64 of mandrel spreader 16. FIG. 8 shows the mandrel 14 spread by second spreading surface 66 of mandrel spreader 16. In accordance with an important feature of the present invention, it should be noted in FIGS. 5 and 8 that the elastomeric O-rings 40 of mandrel spreader 16 maintain the segments 38 of mandrel 14 evenly spaced when spread. When the mandrel 14 is in its proper position for bushing or bearing removal, the mandrel spreader 16 is inserted by hand, as shown in FIG. 4, and the driving end 22 of the driving shaft 12 then can be contacted with a driving device, such as a hammer, for bushing or bearing removal. The apparatus after bushing removal is shown in FIG. 6. Once removed, the mandrel spreader 16 is pulled away from the drive shaft 12 so that the mandrel 14 collapses and the bushing can be removed together with the mandrel 14 to leave the driving shaft free for removal from the transmission pump. The mandrel spreader 16 includes a longitudinal aperture 70 extending to the end of mandrel spreader 16 (FIG. 6) and in fluid connection with an elongated driving shaft receiving aperture 72 in mandrel spreader 16, so that the mandrel spreader 16 can be easily inserted and removed from the mandrel 14 inner surface 44 without creating a vacuum or pressure within the interior of the mandrel spreader 16.

Figure 17:
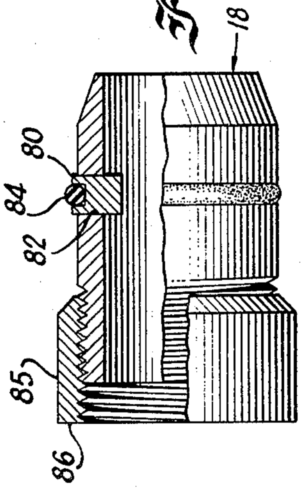
FIG. 17 is a partially elevational, partially broken away side view showing an alternate embodiment of the depth stop sleeve.
Figures 11, 12, 13, 14, 15, 16:
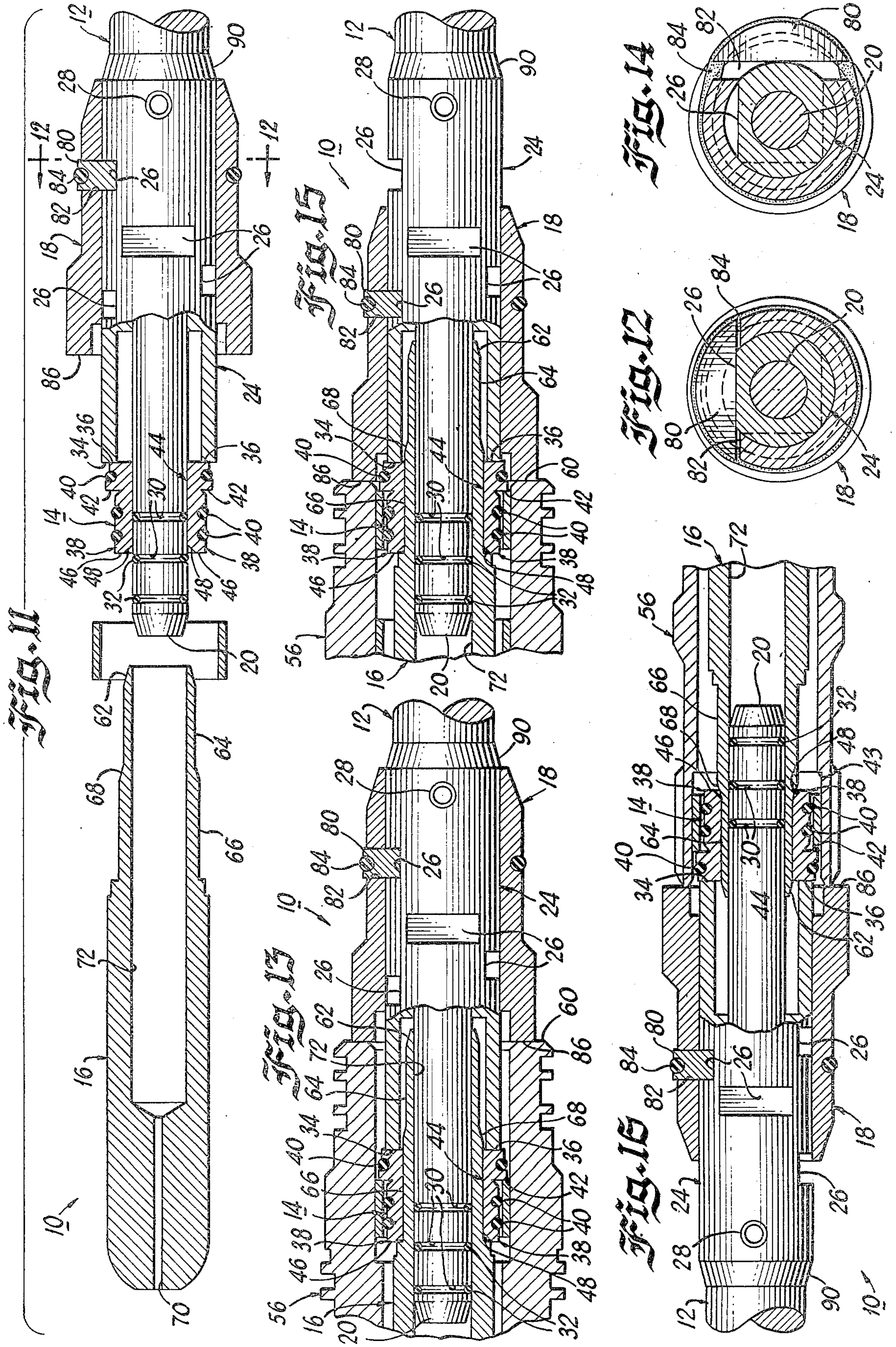
FIG. 11 is a partially elevational, partially broken-away view of the portion of the apparatus of the present invention showing the depth stop sleeve being positioned on the elongated driving shaft for aligning a bushing in its proper location for insertion.
FIG. 12 is a cross-sectional view of the apparatus of the present invention taken along the line 12—12 of FIG. 11.
FIG. 13 is a partially elevational, partially broken-away view of the apparatus of the present invention shown at the end of the driving step for bushing insertion into its central position within the rear of an automobile transmission pump.
FIG. 14 is a cross-sectional view of the apparatus of the present invention showing the depth stop sleeve of FIG. 12 being rotated to remove the depth key from the slot.
FIG. 15 is a partially elevational, partially broken-away cross-sectional view of the apparatus of the present invention showing the depth stop sleeve at the end of its driving insertion when inserting a bushing into its rear position at the rear end of an automobile transmission pump.
FIG. 16 is a partially elevational, partially broken-away cross-sectional view of the apparatus of the present invention showing the depth stop sleeve at the end of its driving insertion when inserting a bushing in the front end of an automobile transmission pump.

When a bushing or bearing is inserted into a device such as an automobile transmission pump, the depth stop sleeve 18 is used to assure that the bushing or bearing is properly located at the desired depth as shown in FIGS. 11, 15 and 16. The depth stop sleeve 18 includes a depth key 80 held within a slot 82 within the depth stop sleeve 18 such that the key 80 protrudes within the interior of depth stop sleeve 18 by being held within a slot 82 within the depth stop sleeve 18 by being held therein with an elastomeric O-ring 84. The depth stop sleeve 18 is slid over the driving shaft 12, as shown in FIG. 11, so that the depth key 80 is positioned within one of the desired slots 26 to position a flat depth stop end 86 of the depth stop sleeve 18 as close to the mandrel 14 as is necessary to properly position the bushing or bearing within the transmission group. The bushing or bearing is inserted to its properly located position, as shown in FIGS. 13, 15 and 16. The depth stop sleeve is positioned so that depth stop key 80 falls inwardly into a desired slot 26. In accordance with the embodiment shown in FIG. 17, the depth stop sleeve is manufactured in two parts, threadedly connected, so that the depth stop sleeve can be finely adjusted to achieve its proper position by turning threaded depth stop sleeve portion 85 to move the depth stop end 86 slightly closer or farther away from mandrel 14. When only few devices are being repaired sufficient slots 26 can be provided for proper positioning of depth stop end 86 so that the depth stop sleeve can be a single piece with the fine threaded adjustment being unnecessary.

The driving shaft 12 has a tapered surface 88 on its driving end 22 to raise the depth key 80 from its normal position within the interior of the depth stop sleeve 18 so that the depth stop sleeve 18 can be slid over the driving shaft driving end 22, past the locating lines 50, 52 until it reaches a second tapered surface 90 of driving shaft member 24. Tapered surface 90 raises the depth key 80 further so that the depth stop sleeve 18 can be slid over shaft member 24 until the depth key 80 is positioned over a proper one of slots 26 so that the depth stop end 86 of depth stop sleeve 18 is properly positioned for insertion of the bushing or bearing to a desired depth within a transmission pump or other device. The slots 26 can be properly labeled for model of transmission pump or other device and whether the bushing or bearing is being inserted into the front or rear end of the transmission pump or the like for easily positioning the depth key 80 within the proper slot for proper bushing or bearing insertion to the proper depth by the normally or less than normally skilled mechanic. For this purpose, the depth stop sleeve is provided with an arrow, as shown in FIGS. 9 and 10 for pointing to the proper designation on the driving shaft to indicate the proper slot for insertion of a bushing into a particularly designated device. FIGS. 9 and 10 show the driving shaft 12 designated with F and R intended to indicate the Front and Rear of a transmission pump. It has been found that only five slots 26 are necessary for properly inserting bushings within almost all of General Motors transmission pumps being manufactured today.

After the depth stop sleeve 18 has been positioned over the driving shaft 12 and the mandrel 14 has been positioned in the same manner as it was positioned for bushing or bearing removal, as shown in FIG. 11, a bushing or bearing to be inserted is placed over the mandrel 14 and the mandrel 14 is spread with the mandrel spreader 16 to secure the bushing or bearing against the outer elastomeric O-rings of mandrel 14 in non-slip engagement. The driving shaft 12 together with the mandrel 14 and mandrel spreader 16 are inserted within the transmission pump and the driving end 22 of the driving shaft 12 is contacted with a driving means, such as a hammer, to insert the bushing or bearing until the depth stop end 86 of the depth stop sleeve 18 contacts the end (i.e 60, FIG. 13) of a transmission pump to insert the bushing or bearing to its proper location.

The depth key 80 of depth stop sleeve 18 is halfmoon or hemispherical segment shaped, as are the slots 26 so that the depth key 80 easily can be removed from one slot by a twisting motion on the depth stop sleeve 18 so that the depth stop sleeve 18 can be moved longitudinally with respect to the driving shaft 12 until the depth key 80 overlies the desired slot 26. The above-described angular movement of the depth stop sleeve 18 removes the depth key 80 from any given slot 26 so that the depth stop sleeve 18 can be moved longitudinally with respect to the driving shaft 12 for insertion of the depth key 80 into a different, desired slot as shown in FIGS. 12 and 14. FIG. 9 shows the depth stop sleeve 18 positioned so that the depth key 80 is shown in one slot in solid lines and in another slot in broken lines.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. Apparatus for removing or inserting a bushing or bearing comprising an elongated bushing or bearing driving shaft;

means for contacting an annular bushing or bearing surface, said bushing or bearing contacting means including a bushing or bearing contacting shoulder, said bushing or bearing contacting means being connected to said elongated bushing or bearing driving shaft when operatively assembled for removing or inserting a bushing or bearing; and means for adjusting said bushing or bearing contacting shoulder comprising an elongated spreading shaft having an interior surface adapted to be operatively positioned over said driving shaft, and an exterior surface of said spreading shaft contacting an inner surface of said bushing or bearing contacting means when operatively assembled for removing or inserting a bushing or bearing, said exterior spreading shaft surface in contact with said inner surface of said bushing or bearing contacting means being of substantially constant diameter to apply consistent pressure on said interior surface of said bushing or bearing contacting means each time the spreading shaft is operatively positioned and to adjust said bushing or bearing contacting shoulder outwardly an accurate, consistent predetermined distance each time said spreading shaft is operatively positioned.

2. Apparatus as defined in claim 1 wherein said bushing or bearing contacting means comprises a plurality of segments expandably connected, at least two of said segments including a bushing or bearing contacting shoulder for contacting an annular surface of a bushing or bearing.

3. Apparatus as defined in claim 2 wherein said segments are expandably connected by an expandable elastomeric material.

4. Apparatus as defined in claim 1 wherein said bushing or bearing contacting means includes a driving shaft contacting shoulder for securing said contacting means in force transmitting contact with said elongated bushing driving shaft so that force applied to said bushing driving shaft will be transmitted to said driving shaft contacting shoulder.

5. Apparatus as defined in claim 1 wherein said elongated bushing or bearing driving shaft includes a shoulder for force transmitting contact with said bushing or bearing surface contacting means.

6. Apparatus as defined in claim 1 further including means for attaching said bushing or bearing contacting means to said elongated driving shaft to position said contacting shoulder at a predetermined position along said driving shaft.

7. Apparatus as defined in claim 1 wherein said elongated driving shaft includes a bushing or bearing surface contacting end and a driving end, said bushing or bearing contacting end being of smaller dimension than said driving end.

8. Apparatus as defined in claim 7 wherein said bushing or bearing surface contacting end of said driving shaft fits into said bushing or bearing surface contacting means.

9. Apparatus as defined in claim 1 wherein said elongated spreading shaft of said means for adjusting said bushing or bearing contacting shoulder is tapered at one end for insertion between said elongated driving shaft and said bushing or bearing contacting means.

10. Apparatus for holding a bushing in place for insertion within a slot comprising:

an annular elongated surface carrying an elastomeric O-ring extending radially beyond said annular surface; and means for contacting said elastomeric O-ring against an interior surface of a bushing of a predetermined interior diameter to frictionally engage the interior surface of said bushing and compress said O-ring against the interior bushing surface to frictionally hold said bushing on said annular surface during insertion of said bushing.

11. Apparatus for inserting a bushing or bearing comprising an elongated bushing or bearing driving shaft;

means for contacting an annular bushing or bearing surface, said bushing or bearing contacting means including a bushing or bearing contacting shoulder said bushing or bearing contacting means being connected to said elongated bushing or bearing driving shaft when operatively assembled for removing or inserting a bushing or bearing;

means for adjusting said bushing or bearing contacting shoulder to a desired dimension to contact at least a portion of an annular bushing or bearing surface;

means for applying an inserting force to said annular bushing surface through said bushing contacting shoulder; and stop means for limiting the depth of penetration of said contacting shoulder to a predetermined depth.

12. Apparatus as defined in claim 11 wherein said stop means is disposed over said driving shaft and further including means for fixing the position of said stop means to a predetermined location on said driving shaft.

13. Apparatus as defined in claim 12 wherein said means for fixing the position of said stop means includes a plurality of slots in an exterior surface of said driving means for receiving a portion of said stop means therein.

14. A method of inserting a bushing or bearing in a device comprising:

inserting an expandable mandrel over an elongated driving shaft so that a surface of the mandrel is disposed against a driving surface of said driving shaft;

inserting a bushing or bearing over said mandrel so that one surface of said bushing or bearing is in contact with a driving surface of said mandrel;

Spreading the mandrel in an amount sufficient to hold said bushing or bearing in position on said mandrel by inserting an elongated spreaded shaft between said driving shaft and an inner surface of said mandrel, said spreading shaft having an interior surface adapted to be operatively positioned over said driving shaft, and an exterior surface of said spreading shaft contacting an inner surface of said mandrel when operatively assembled for removing or inserting a bushing or bearing, said exterior spreading shaft surface in contact with said inner surface of said mandrel being of substantially constant diameter to apply consistent pressure on said interior surface of said mandrel each time the spreading shaft is operatively positioned and to adjust said bushing or bearing contacting shoulder outwardly an accurate, consistent predetermined distance each time said spreading shaft is operatively positioned;

applying a driving force to said driving shaft until said bushing or bearing is in its intended location; and removing the driving shaft and mandrel from the device.

15. A method as defined in claim 14 wherein said mandrel spreading shaft is removed after bushing or bearing insertion to collapse said mandrel for easy removal of the driving shaft and mandrel from the device.

16. A method of inserting a bushing or bearing in a device comprising:

inserting an expandable mandrel over an elongated driving shaft so that a surface of the mandrel is disposed against a driving surface of said driving shaft;

adjusting a depth stop sleeve over said elongated driving shaft to a predetermined position;

inserting a bushing or bearing over said mandrel so that one surface of said bushing or bearing is in contact with a driving surface of said mandrel;

spreading the mandrel in an amount sufficient to hold said bushing or bearing in position on said mandrel;

applying a driving force to said driving shaft until the depth stop sleeve contacts a surface of the device so that the driving shaft cannot be further inserted into the device.

17. Apparatus for removing or inserting a bushing or bearing comprising an elongated bushing or bearing driving shaft;

means for contacting an annular bushing or bearing surface, said bushing or bearing contacting means including a bushing or bearing contacting shoulder, said bushing or bearing contacting means being connected to said elongated bushing or bearing driving shaft when operatively assembled for removing or inserting a bushing or bearing; and means for adjusting said bushing or bearing contacting shoulder comprising an elongated spreading shaft having an interior surface adapted to be operatively positioned over said driving shaft, and an exterior surface of said spreading shaft contacting an inner surface of said bushing or bearing contacting means when operatively assembled for removing or inserting a bushing or bearing, said exterior spreading shaft surface in contact with said inner surface of said bushing or bearing contacting means including a plurality of distinct exterior surface portions each having a substantially constant but different exterior diameter to adjust said bushing or bearing contacting shoulder outwardly to a desired predetermined position dependent upon which exterior spreading shaft surface is in contact with said inner surface of said bushing or bearing contacting means when said spreading shaft is operatively positioned.

18. Apparatus as defined in claim 17 wherein said spreading shaft includes a tapered portion to form a gradual transition between said exterior surface portions of different diameter.

* * * * *